(No Model.)  2 Sheets—Sheet 1.
E. E. WHIPPLE.
CULTIVATOR.
No. 343,936. Patented June 15, 1886.
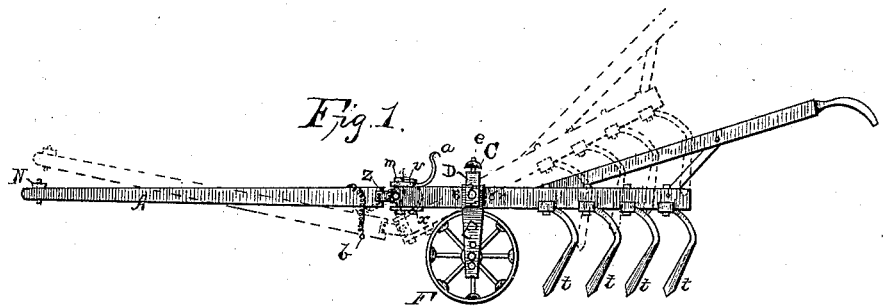
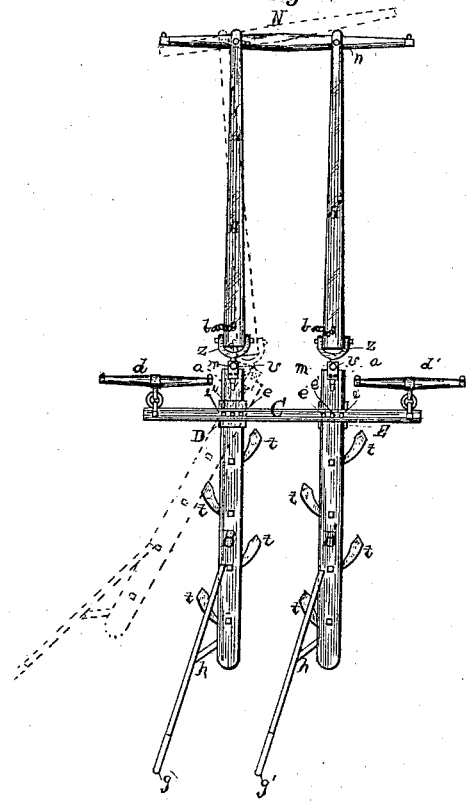
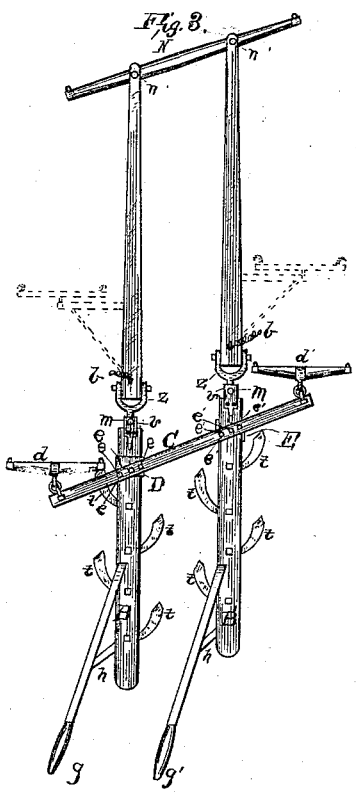
Witnesses:
Geo. W. Rowley
H. E. Piper
Inventor
Effinger E. Whipple
per Huggett & Smith
Attorneys (No Model.)
E. E. WHIPPLE.
CULTIVATOR.
No. 343,936. Patented June 15, 1886.
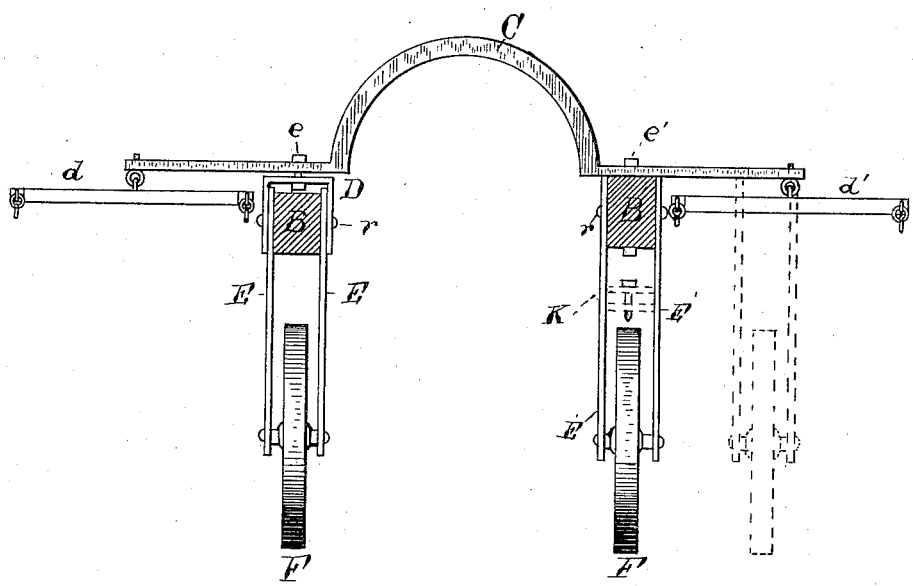
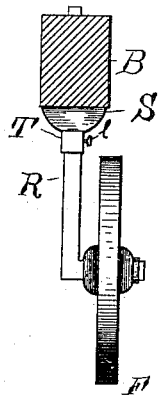
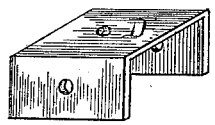

UNITED STATES PATENT OFFICE.

EFFINGER E. WHIPPLE, OF EATON RAPIDS, MICHIGAN.

CULTIVATOR.

SPECIFICATION forming part of Letters Patent No. 343,936, dated June 15, 1886.

Application filed August 3, 1885. Serial No. 173,345. (No model.)

*To all whom it may concern:*

Be it known that I, EFFINGER E. WHIPPLE, a citizen of the United States, residing at Eaton Rapids, in the county of Eaton and State of Michigan, have invented new and useful Improvements in Cultivators, of which the following is a specification.

My invention relates to improvements in double-tongued or straddle-row cultivators, in which the cultivator is moved and operated in two parallel sections, each acting independently of the other with reference to the draft and vertical and lateral action.

The special features of my improvements are, first, to provide a simple, durable, and inexpensive cultivator; second, to provide a cultivator readily adjusted to a wide or narrow row and a deep or shallow furrow; third, to afford ease and facility in adjustment by gaging the sections to any desired width apart, and by utilizing the weight of the tongue of the cultivator in operating and assisting in balancing the drag-bars over pivotal wheels, making a special feature of simple construction and easy operation; and, fourth, to obtain a steady gradual draft. I attain these objects by the mechanism illustrated in the accompanying drawings, in which—

Figure 1 is a side view representing the cultivator in position as being operated, the dotted lines indicating its position when not in operation and being moved from one place to another. Fig. 2 is a perpendicular view of my cultivator with both sections even. Fig. 3 is a like view with one section in advance of the other. Fig. 4 is a rear view showing a sectional view of the drag-bars immediately back of the arched cross-bar. Fig. 5 is the oscillating cap, and Fig. 6 is one of the wheels attached to a section of the drag-bar by a shifting-journal and set screw.

Similar parts are referred to by the same letters throughout the several views.

In the drawings, B B' are the drag-bars, carrying the shovels or teeth *t t t*, to which the handles *g g'* are attached for operating the cultivator. The handles *g g'* are attached to the rear end of the drag-bars B B' in the ordinary way, and are strengthened by braces *h h*.

To the forward part of the drag-bars B B', over the pivotal wheels F F', I bolt the cross-bar C in such manner as to allow an independent forward and backward movement by placing the bolt *r* directly through the drag-bar B' loose enough to allow free lateral action of the cross-bar B' around the bolt *e'*, immediately under the cross-bar C. The cross-bar C is arched in the center, and at the places of attachment to the drag-bars B B' is provided with bolt-holes *e e e e' e' e'*, for the purpose of increasing or diminishing the distance between the drag-bars B B'.

To the drag-bar B, I bolt the oscillating cap D, constructed of iron, by passing a bolt, *r*, through the sides of the cap D and the drag-bar B, loose enough to allow the drag-bar B to turn vertically upon the bolt *r*, Fig. 4.

To the top of the cap D is bolted or riveted the cross-bar C by means of the bolt *e*, so as to allow the drag-bar B to turn laterally around the bolt *e*. It will thus be seen that the cap D and the bolt *r* forms a swivel-joint, and any equivalent producing the same result as the device shown may be used, since I do not wish to be confined to the attachment by the means of the cap D. When the drag-bar B', secured as above mentioned, is raised, the cross-bar C turns in conjunction with the cap D around the bolt *r*, while the drag-bar B, when raised, turns vertically upon the bolt *r* independently of the cross-bar C.

The cultivator is supported by two wheels, F F'—one under each of the drag-bars B B'—at their intersection with the cross-bar C by the iron bars E E E' E', in which position the bottom of the wheels F F' forms the pivotal point of the drag-bars B B' when turned in the position indicated by the dotted lines in Fig. 2. A caster-joint, K, may also be constructed between the wheels F F' and the drag-bars B B', changing the pivotal point directly over the wheel, as in Fig. 4. It will readily be observed in this connection that the weight of the tongues A A' is utilized in operating the drag-bars B B' either to an elevated or lateral position by balancing the drag-bars B B' upon the axle of the wheels F F'. By connecting the several parts in the manner herein set forth the cultivator is controlled and operated with the freedom of a tongueless cultivator without retaining the dead weight incident thereto, and possesses the advantage of a tongue in guiding and turning. The bolts e and e' may also be used to support the drag-bars B B', provided it is found desirable to move the wheels to the ends of the cross-bar C, as shown by the dotted lines in Fig. 4; or a journal, R, may be placed in a socket, S, and attached to the side or passing through the drag-bar B, and adjusted to a high or low position by the set screw l, passing through the collar T, as shown in Fig. 6. The drag-bars B B' are attached to the end of the tongues A A' by any desirable method to form a vertical and lateral hinge and to prevent a tilting or rolling motion. In the device shown the slotted bolt m between the plates x and v receives the crotched tongues z z'. Directly in front of the horses is the neck-yoke N, connected to the tongues A A' at n n, so as to allow the tongues A A' and the drag-bars B B' free play forward and back.

To the end of the cross-bar C, I attach the single-trees d d'; or, if found desirable, the single-trees d d' may be attached to a side iron screwed either to the tongues A A' or the drag bars B B', as shown by dotted lines in Fig. 3. When not in operation, or passing along the road, the teeth t t t are elevated off of the ground by raising the ends of the drag-bars B B' and placing a link of the chain b over the hook a, as dotted in Fig. 1. The rear of the drag-bars B B' may also be raised to any desirable elevation, either for the purpose of raising the teeth t t t entirely out of the ground or to gage the teeth t t t to any desirable depth in the ground, by means of a spring or the chains b b or other suitable device.

By having the drag-bars B B' attached directly to the ends of the tongues A A', a steady motion is imparted to the cultivator, which moves gradually with the horses, and which is prevented from jumping and jerking. The cross-bar C, to which the horses are hitched, being attached directly to the drag-bars B B', also tend to impart a steadier and lighter motion than when the coupling is elevated. The teeth t t t are also gaged to any desirable depth in the ground by moving the pivotal point formed by the wheels F F' and the cross-bar C forward or back on the drag-bars B B' at r r r. Any desirable distance toward or from the row can be obtained by moving either handle g or g' to the right or left, as the weight of the tongues A A', attached to the ends of the drag-bars B B', assist in raising the rear of the drag-bars B B' and give an easy lateral motion.

I am aware that prior to my invention double-tongued cultivators have been in use with the drag-bars attached to the sides or on the top or bottom of the tongue by various means and devices, but not embodying any of the features hereby claimed as my improvements.

I do not claim, broadly, a cultivator having independent beams and tongues with horizontal and vertical adjustments or independent forward and backward movement on each side.

What I claim as new, and desire to secure by Letters Patent, is—

1. In double-tongued or straddle-row cultivators, the combination of the drag-bars B B' with the independent tongues A A', each drag-bar pivoted or jointed directly to the end of its tongue, substantially as shown and described.

2. The combination of the drag-bars B B', the cross-bar C, the wheels F F', and the independent tongues A A', the cross-bar swiveled to the drag-bars and the wheels rigid to the drag-bars, substantially as described and set forth.

3. The combination of the drag-bars B B', pivotally connected at their forward ends to the rear end of the independent tongues A A', the oscillating cap D or its equivalent, the gaged or adjustable cross-bar C, connecting the drag-bars at a point back of their connection with the tongues, and the supporting-wheels F F', readily adjusted forward and back on the drag-bars for balancing them, substantially as set forth and described.

EFFINGER E. WHIPPLE.

Witnesses:
PARM S. DeGRAFF,
JAMES M. POWERS.